(12) United States Patent
Yan et al.

(10) Patent No.: US 8,780,725 B2
(45) Date of Patent: Jul. 15, 2014

(54) PRESENTATION SYSTEM AND METHOD

(75) Inventors: Yiqiang Yan, Beijing (CN); Chengkun Sun, Beijing (CN); Hongwei Li, Beijing (CN)

(73) Assignees: Beijing Lenovo Software Ltd., Beijing (CN); Lenovo (Bejing) Limited, Beijing (CN)

( * ) Notice: Subject to any disclaimer, the term of this patent is extended or adjusted under 35 U.S.C. 154(b) by 1165 days.

(21) Appl. No.: 11/965,346

(22) Filed: Dec. 27, 2007

(65) Prior Publication Data

US 2008/0165842 A1 Jul. 10, 2008

(30) Foreign Application Priority Data

Jan. 4, 2007 (CN) .......................... 2007 1 0063227

(51) Int. Cl.
*H04L 12/44* (2006.01)
(52) U.S. Cl.
USPC ........................................................ 370/240
(58) Field of Classification Search
USPC .................................................. 375/240.01
See application file for complete search history.

(56) References Cited

U.S. PATENT DOCUMENTS

| | | | |
|---|---|---|---|
| 6,259,443 B1 | 7/2001 | Williams, Jr. | |
| 7,243,140 B2 * | 7/2007 | Gupta et al. ................. | 709/219 |
| 2003/0025648 A1 | 2/2003 | Glen et al. | |
| 2005/0271070 A1 | 12/2005 | Mikami et al. | |
| 2006/0002315 A1 | 1/2006 | Theurer et al. | |
| 2006/0203007 A1 | 9/2006 | Bullard et al. | |
| 2007/0055941 A1 * | 3/2007 | Bhakta et al. ................. | 715/739 |
| 2007/0081459 A1 * | 4/2007 | Segel et al. ................... | 370/230 |
| 2007/0169115 A1 * | 7/2007 | Ko et al. ....................... | 717/174 |
| 2007/0250872 A1 * | 10/2007 | Dua .............................. | 725/81 |

FOREIGN PATENT DOCUMENTS

| | | |
|---|---|---|
| CN | 1758246 A | 12/2006 |
| GB | 2 438 041 A | 11/2007 |
| JP | 2002268868 A | 9/2002 |
| JP | 2004102063 A | 4/2004 |
| JP | 2007526565 A | 9/2007 |
| WO | WO 03/027830 A1 | 4/2003 |
| WO | WO 2005/083558 A1 | 9/2005 |
| WO | WO 2006/043977 A1 | 4/2006 |

OTHER PUBLICATIONS

SideShow APIs, , Windows SideShow—Wikipedia, the free encyclopedia, Mar. 31, 2008, 3 pages.
Extended display identification data, Wikipedia, the free encyclopedia, Mar. 31, 2008, 10 pages.

* cited by examiner

*Primary Examiner* — Mark Rinehart
*Assistant Examiner* — Matthew Hopkins
(74) *Attorney, Agent, or Firm* — Patterson Thuente Pedersen, P.A.

(57) ABSTRACT

A presentation system and method is disclosed, and the method includes the steps of: creating at least one buffer area in a first presentation device for at least one application; relocating the presentation-related data of a running application to the buffer area; and intercepting the presentation-related data from the buffer area and transmitting them to at least one second presentation device. With the above configuration of the present invention, the presentation-related data of various applications running in the host can be redirected as demanded by a user to a corresponding presentation device. With only one host, multiple application windows can be presented on multiple presentation devices at the same time.

9 Claims, 3 Drawing Sheets

PRESENTATION SYSTEM AND METHOD

RELATED APPLICATION

The present application claims priority to Chinese Application No. 200710063227.0 filed Jan. 4, 2007, which is incorporated herein in its entirety by reference.

FIELD OF THE INVENTION

The present invention relates to the technology of playing audio/video, and in particular to a presentation system and method which can redirect an application window and/or audio on a computer to the display screen of a video device and/or a stereo.

BACKGROUND OF THE INVENTION

One of the most important points in 3C convergences is to increase the convenience in using a personal computer (PC) and to enhance the cooperation between a PC and a presentation device with weak computing capability, such as a TV.

Thus, Microsoft® has proposed a scheme, Sideshow®, in Windows Vista®, which enables some display devices with weak computing capabilities to display the contents of certain application windows in a host. For example, certain application windows on a PC can be redirected to an auxiliary display screen, since a special data transmission format is defined between these applications and the auxiliary display screen, and there exists a mechanism of display redirection between these applications and the operating system. As such, only the window of an application conforming to this standard defined by Microsoft® can be displayed on the auxiliary display screen. Besides, this technique does not allow a user to execute any PC program at the side of the display device.

Further, a remote game system from Intel® attempts to utilize a TV set as the auxiliary display device of a PC for game display. For example, in this system, the virtual video card technique is used to effectuate a control over the PC at the side of the display device. Unfortunately, such a scheme is complex to implement, and if a plurality of auxiliary display devices are present, it is necessary to install a corresponding number of virtual video card drivers.

SUMMARY OF THE INVENTION

The present invention is done in view of the above problems. The object of the present invention is to provide a presentation system and method which can redirect an application window and/or audio on a computer to a presentation device.

In one aspect of the present invention, a presentation method is provided, comprising the steps of: creating at least one buffering area in a first presentation device for at least one application; relocating the presentation-related data of a running application to the buffering area; and intercepting the presentation-related data from the buffering area and transmitting them to at least one second presentation device.

The presentation method may further comprise a step of intercepting audio data and/or video data from the buffering area and transmitting them to the second presentation device.

In one embodiment, the video data is a rendering instruction or a rendered image.

In one embodiment, the presentation method further comprises a step of establishing a connection between the first and second presentation devices before the step of transmitting.

In one embodiment, the step of establishing a connection comprises: transmitting a probe packet including at least the host address from the first presentation device to the second presentation device; transmitting a response including at least the address of the second presentation device from the second presentation device to the first presentation device; and establishing a connection between the first and second presentation devices based on the addresses of the first and second presentation devices.

In one embodiment, the probe packet further includes the name of the first presentation device, and the response further includes the image-displaying capability and/or the supported audio format and the name of the second presentation device.

In one embodiment, the step of establishing a connection comprises: transmitting announcement information including at least the address of the second presentation device from the second presentation device to the first presentation device; transmitting a response including at least the address of the first presentation device from the first presentation device to the second presentation device; and establishing a connection between the first and second presentation devices based on the addresses of the first and second presentation devices In one embodiment, the announcement information further includes the image-displaying capability and/or the supported audio format and the name of the second presentation device, and the response further includes the name of the first presentation device.

In one embodiment, the step of relocating comprises: monitoring the instance name of the application; finding a function invocation related to a presentation output inside the process of the instance; and modifying the output function and outputting the presentation-related data of the application to the buffering area.

In another aspect of the present invention, a presentation system is provided, comprising: a first presentation device which includes a monitoring means for creating at least one buffering area in the first presentation device for at least one application and relocating the presentation-related data of a running application to the buffering area, and a communication means for intercepting the presentation-related data from the buffering area and transmitting them to at least one second presentation device.

With the above configuration of the present invention, the presentation-related data of various applications running in the host can be redirected as demanded by a user to a corresponding presentation device for presentation. With only one host, multiple application windows and/or videos can be presented on multiple presentation devices at the same time. Further, the presentation device needs only picture parsing and displaying capabilities, but not computing ability.

BRIEF DESCRIPTION OF THE DRAWINGS

The above features and advantages of the present invention will be more apparent from the following detailed description taken in conjunction with the drawings, in which.

DETAILED DESCRIPTION

Hereafter, several embodiments of the present invention will be described with reference to the figures, in which the same reference signs denote the same or similar components though they are illustrated in different figures.

Figure 1:
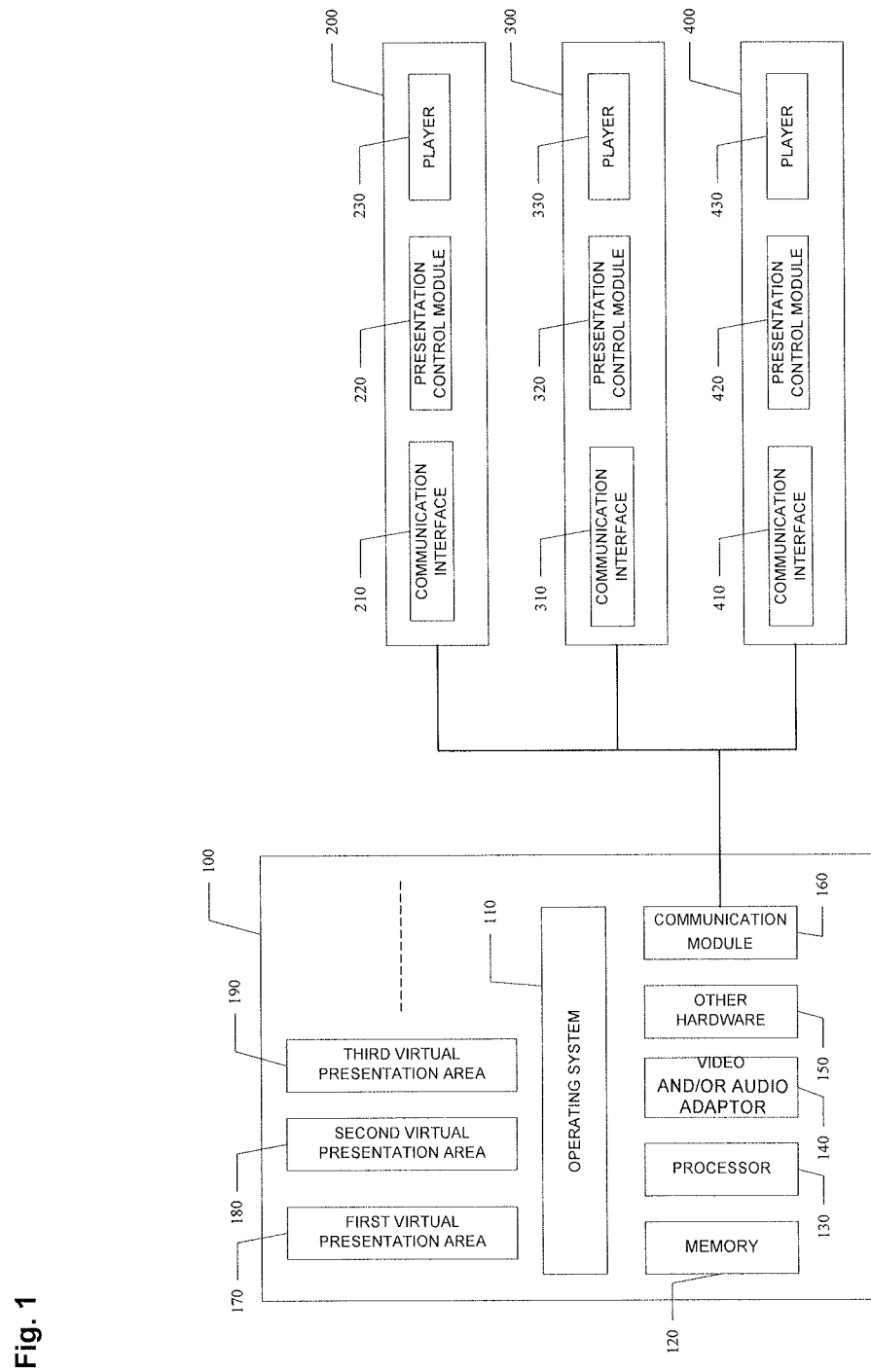
FIG. 1 shows a schematic block diagram of a presentation system according to one embodiment of the present invention.

FIG. 1 shows a block diagram of a presentation system according to one embodiment of the present invention. As shown in FIG. 1, the presentation system of the present embodiment comprises a host 100, such as a PC, and at least one presentation device 200, 300, or 400 which can be provided with only picture parsing and displaying capabilities and/or audio reproducing capability and without computing ability.

As shown in FIG. 1, the host 100 includes a processor 130, a video card and/or audio card 140, a memory 120, an operating system 110, a communication module 160 and other hardware devices. In addition to the video card and/or audio card 140, the host 100 has at least one virtual representation area, such as the first virtual representation area 170, the second virtual presentation area 180 and the third virtual presentation area 190, used for buffering the window image and/or audio data of each of the monitored applications.

Additionally, on the operating system 110 of the host 100, a monitoring software is running to monitor the presentation-related data, such as video and audio data, in an application specified by a user, and to relocate these presentation-related data to a buffering area, that is, the first virtual presentation area 170, the second virtual presentation area 180 or the third virtual presentation area 190.

The communication module 160 in the host 100 can be a data interface for external communication, such as a general-purpose data transport interface of serial port, parallel port, IR, Bluetooth, ZigBee, UWB, USB, 1394, 802.3, 802.11, 802.16, 802.20, GSM/GPRS/CDMA, CDMA2000/WCDMA/TDS-CDMA and the like, to transmit the presentation-related data relocated to the virtual presentation area to the presentation devices 200, 300, 400.

The presentation device 200 includes a player 230, a presentation control module 220 and a communication interface 210. The presentation control module 220 is provided with an image parsing ability and/or an audio presentation ability so as to restore image information received from the communication interface 210 corresponding to the communication module 160 in the host 100 to a real image and display it on the display screen 230, and/or to play out audio data received from the communication interface. Here, the image information can be a plotting instruction, original image information or compressed image data.

Similarly, the presentation device 300 includes a player 330, a presentation control module 320 and a communication interface 310, and the presentation device 400 includes a player 430, a presentation control module 420 and a communication interface 410.

The presentation device 200 needs to establish connection with the host 100 before actual presentation if it receives audio/video data wirelessly. In this case, the presentation device 200 can initiatively broadcast an information packet which includes: (1) a prescribed field, such as UUID, indicating that this device is a presentation device as defined in the present invention; (2) the name of the presentation device; (3) the IP address of the presentation device; (4) the physical display ability, such as resolution of 640×480, and the supported audio playing format of the presentation device; and (5) the capability of the decoder in the presentation controller, such as MPEG2 decoding capability.

Figure 2:
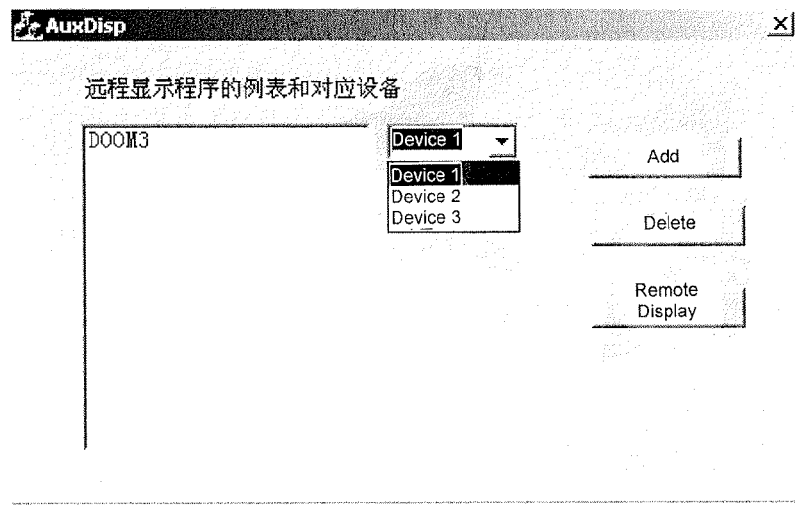
FIG. 2 shows a schematic diagram of a presentation device selection interface displayed on the display screen of a host.
Figure 3:
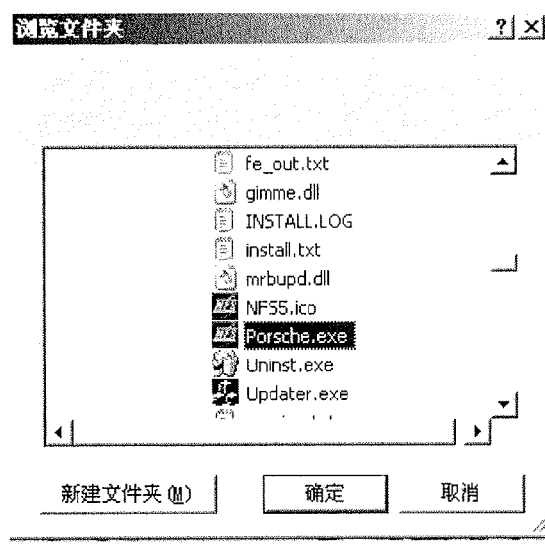
FIG. 3 shows a schematic diagram of a monitored program selection interface displayed on the display screen of the host.

Having received the information packet, the host 100 adds the name of the presentation device to a device list shown in FIG. 2, specifies simultaneously a remote presentation application corresponding to the presentation device and transmits a response, which contains (1) the name of the host, (2) the IP address of the host, and (3) a program list to be used in remote presentation. As shown in FIG. 3, after receiving this response, the presentation device 200 displays the program list for selection from the host 100 on the display screen, and thus a wireless connection is established between the presentation device 200 and the host 100 based on their IP address. The user of the presentation device 200 can select an application whose window is to be redirected to the presentation device 200 and send the program name to the host 100. Then, the host 100 can start the selected application and create a display buffer area for the display device 200 according to its physical device resolution. The host 100 also creates an audio buffering area if the application to be displayed on the presentation device involves not only video, but also audio.

In another embodiment, the host 100 can broadcast a probe packet at regular time intervals, with the probe packet containing at least the name and the IP address of the host. The presentation device 200, having received the probe packet, will send a response to the host 100 if it wants to establish connection with the host 100. Such response includes: (1) a prescribed field, such as UUID, indicating that this device is a presentation device as defined in the present invention; (2) the name of the presentation device; (3) the IP address of the presentation device; (4) the physical display ability, such as resolution of 640×480, and the supported audio playing format of the presentation device; (5) the capability of the decoder in the presentation controller, such as MPEG2 decoding capability. In this way, the host 100 can establish connection with the presentation device based on the IP addresses after the reception of the response.

Now, as shown in FIG. 2, the user can click 'add' and select an application to be added to the list of monitored programs from a pop-up folder dialogue box. Meanwhile, the user can select a corresponding remote display list for the presentation device 200. The monitored status of the selected application will be released if 'delete' is clicked on. If the user clicks 'remote display', the window of the application will be directly displayed on the presentation device 200, as shown in FIG. 3.

In addition to the above case where a program is selected from the program list at the side of the remote display device and then a request is transmitted to the host for starting the selected application, the user can start the remote display program in the following approach: (1) executing the monitoring program directly on the host, with the monitoring program conducting post-processing as soon as it monitors the execution of the program; (2) directly double-clicking the program or selecting the program and then clicking the remote display button on the monitoring program interface.

Figure 4:
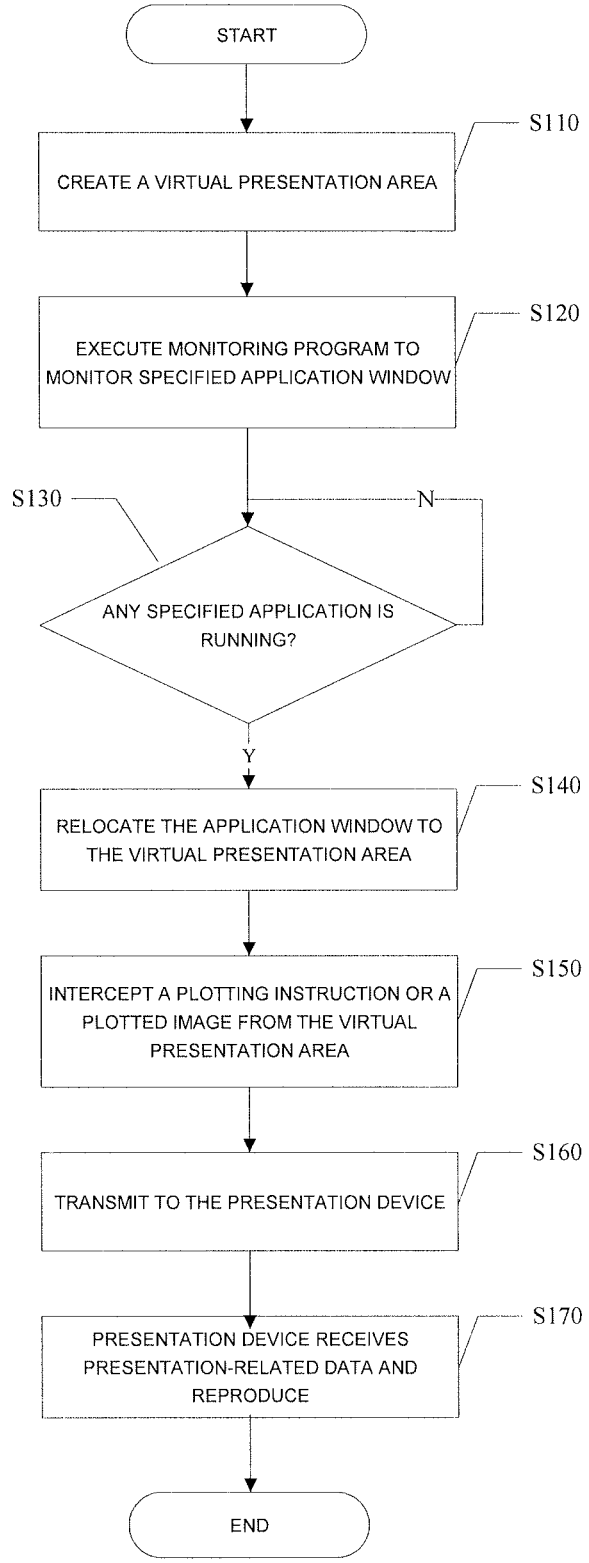
FIG. 4 shows a flowchart of the operation procedure of the presentation system according to one embodiment of the present invention.

FIG. 4 shows a flowchart of the operation procedure of the presentation system according to one embodiment of the present invention.

As mentioned above, the host 100 first creates a display buffering area and/or an audio buffering area for the application (S110). Then, the monitoring program is run to specify an application window (S120). While the specified application is running (S130: YES), the monitoring program enters the process space of the application via a system hook, searches for all functions related to audio/video output, such as BitBlt, Present, Waveout, etc., and modifies the pointers of these functions so as to direct the audio/video output to the above display buffering area and/or the audio buffering area (S140).

Then, the host 100 intercepts the plotting instruction or a rendered image from the virtual display area and sends it to the presentation device (S150), or MPEG2-compresses the updated display and video data each time and transmits them to the presentation device via a wireless connection (S160).

Eventually, at the reception of the compressed data, the presentation device MPEG2-decodes the data for further display (S170).

The foregoing description is intended to only illustrate several embodiments of the present invention. Those skilled in the art will understand that any modification and partial substitution made within the scope of the present invention should be encompassed by the scope of the present invention in the claims. Thus, the scope of the present invention should be defined by the appended claims.

What is claimed is:

1. A presentation method, comprising the steps of:
    providing a first buffering area for an application to be presented on a first presentation device;
    creating at least one second buffering area in the first presentation device for at least one running application based on image-displaying capability or a supported audio format of at least one second presentation device, wherein the second buffering area is different from the first buffering area;
    relocating a presentation-related data of a running application to said second buffering area; and
    intercepting the presentation-related data from said second buffering area and transmitting the presentation-related data to the at least one second presentation device so as to display the presentation-related data on the second presentation device and display the application on the first presentation device at the same time;
    said step of relocating comprises:
        monitoring the instance name of said application;
        finding a function invocation related to a presentation output inside the process of the instance; and
        modifying the output function and outputting the presentation-related data of said application to said buffering area.

2. The presentation method of claim 1, further comprising a step of intercepting audio data and/or video data from said second buffering area and transmitting them to said second presentation device.

3. The presentation method of claim 2, wherein said video data is a rendering instruction or a rendered image.

4. The presentation method of claim 1, further comprising a step of establishing a connection between said first and second presentation devices before said step of transmitting.

5. The presentation method of claim 4, wherein said step of establishing connection comprises:
    transmitting a probe packet including at least the host address from said first presentation device to said second presentation device;
    transmitting a response including at least the address of said second presentation device from said second presentation device to said first presentation device; and
    establishing a connection between said first and second presentation devices based on the addresses of said first and second presentation devices.

6. The presentation method of claim 5, wherein said probe packet further includes the name of said first presentation device, and said response further includes the image-displaying capability and/or the supported audio format and the name of said second presentation device.

7. The presentation method of claim 4, wherein said step of establishing a connection comprises:
    transmitting announcement information including at least the address of said second presentation device from said second presentation device to said first presentation device;
    transmitting a response including at least the address of said first presentation device from said first presentation device to said second presentation device; and
    establishing a connection between said first and second presentation devices based on the addresses of said first and second presentation devices.

8. The presentation method of claim 7, wherein said announcement information further includes the image-displaying capability and/or the supported audio format and the name of said second presentation device, and said response further includes the name of said first presentation device.

9. A presentation system, comprising:
    a first presentation device which includes a processor configured to provide a first buffering area for an application to be presented on a first presentation device, create at least one second buffering area in said first presentation device for at least one running application based on image-displaying capability or a supported audio format of at least one second presentation device and relocate a presentation-related data of a running application to said second buffering area, wherein the second buffering area is different from the first buffering area, and
    a communication module configured to intercept the presentation-related data from said second buffering area and transmit the presentation-related data to at least one second presentation device so as to display the presentation-related data on the second presentation device and display the application on the first presentation device at the same time;
    the first presentation device is configured to relocate the presentation-related data of a running application to said second buffering area by:
        monitoring the instance name of said application;
        finding a function invocation related to a presentation output inside the process of the instance; and
        modifying the output function and outputting the presentation-related data of said application to said buffering area.

* * * * *